US012803961B2

(12) United States Patent
Hall et al.

(10) Patent No.: US 12,803,961 B2
(45) **Date of Patent: *Nov. 17, 2026**

(54) INFLIGHT NETWORK DATA ENCRYPTION

(71) Applicant: Truist Bank, Charlotte, NC (US)

(72) Inventors: Kenneth Hall, Roswell, GA (US); Michael Radonis, Holly Springs, NC (US); Bobby Len Robins, Raleigh, NC (US)

(73) Assignee: TRUIST BANK, Charlotte, NC (US)

( * ) Notice: Subject to any disclaimer, the term of this patent is extended or adjusted under 35 U.S.C. 154(b) by 122 days.

This patent is subject to a terminal disclaimer.

(21) Appl. No.: 18/882,361

(22) Filed: Sep. 11, 2024

(65) Prior Publication Data

US 2025/0007896 A1 Jan. 2, 2025

Related U.S. Application Data

(63) Continuation of application No. 17/852,976, filed on Jun. 29, 2022, now Pat. No. 12,120,101.

(51) Int. Cl.
*H04L 9/40* (2022.01)
*G06F 16/182* (2019.01)

(52) U.S. Cl.
CPC ........ *H04L 63/0442* (2013.01); *G06F 16/183* (2019.01)

(58) Field of Classification Search
CPC ... H04L 63/0442; G06F 16/183; G06F 21/60; H04W 12/00
See application file for complete search history.

(56) References Cited

U.S. PATENT DOCUMENTS

| | | | | |
|---|---|---|---|---|
| 9,009,525 | B1 * | 4/2015 | Murphy | H04L 63/061 713/193 |
| 10,015,173 | B1 * | 7/2018 | Efstathopoulos | H04L 63/0442 |
| 10,083,325 | B2 * | 9/2018 | Angus | H04L 9/0822 |
| 10,911,337 | B1 * | 2/2021 | De Kosnik | H04L 67/52 |
| 2002/0120763 | A1 * | 8/2002 | Miloushev | H04L 67/1008 714/E11.034 |

(Continued)

OTHER PUBLICATIONS

Nan et al., "Data Flow Guard for Aircraft Intra-Domain Secure Communication," 2018 IEEE/AIAA 37th Digital Avionics Systems Conference (DASC) Year: 2018 | Conference Paper | Publisher: IEEE.*

(Continued)

*Primary Examiner* — Roderick Tolentino
(74) *Attorney, Agent, or Firm* — Michael A. Springs, Esq.; Shumaker, Loop & Kendrick, LLP; Patrick B. Horne

(57) ABSTRACT

One example described herein includes a system that can perform an inflight encryption of data from a server to a network attached storage (NAS) device. The system can include a first network adapter card that can receive data from the server via a network file system (NFS) protocol. The first network adapter card can determine that the data is unencrypted based at least in part on receiving the data via an NFS port of the server. The first network adapter card can encrypt the data based at least in part on the data being received via the NFS port. The system can transmit the encrypted data to the NAS device via a second network adapter card, where the second network adapter card is configured to decrypt the encrypted data.

20 Claims, 6 Drawing Sheets

(56) References Cited

U.S. PATENT DOCUMENTS

| | | | | |
|---|---|---|---|---|
| 2007/0232316 | A1* | 10/2007 | Reda | H04W 12/033 455/445 |
| 2009/0031128 | A1* | 1/2009 | French | H04L 63/0428 713/164 |
| 2012/0233222 | A1* | 9/2012 | Roesch | G06F 21/50 709/224 |
| 2019/0311137 | A1* | 10/2019 | Mallya | G06N 20/00 |
| 2022/0100618 | A1* | 3/2022 | Jain | G06F 11/1464 |

OTHER PUBLICATIONS

Bilen et al., "Work-in-Progress: Merkle Tree-Based Secure Routing for Digital Twin-Assisted Aircraft Network in 6G Wireless," 2023 IEEE International Black Sea Conference on Communications and Networking (BlackSeaCom) Year: 2023 | Conference Paper | Publisher: IEEE.*

Lokesh et al., "Portable Network Attached Storage Device for Document Management System Using NLP," 2023 5th International Conference on Inventive Research in Computing Applications (ICIRCA) Year: 2023 | Conference Paper | Publisher: IEEE.*

Yasui et al., "SPOT: Analyzing IoT Ransomware Attacks using Bare Metal NAS Devices," 2022 17th Asia Joint Conference on Information Security (AsiaJCIS) Year: 2022 | Conference Paper | Publisher: IEEE.*

* cited by examiner

600

INFLIGHT NETWORK DATA ENCRYPTION

CROSS-REFERENCE TO RELATED APPLICATIONS

The is a continuation of U.S. application Ser. No. 17/852,976, filed Jun. 29, 2022, entitled INFLIGHT NETWORK DATA ENCRYPTION, the entirety of which is incorporated herein by reference.

TECHNICAL FIELD

The present disclosure generally relates to data encryption. More specifically, but not by way of limitation, this disclosure relates to an inflight data encryption over a network implementing a network file system (NFS) protocol.

BACKGROUND

Techniques exist for transmitting encrypted data between endpoint devices over an untrusted channel of communication. For example, a server can implement an encryption protocol that can be used to facilitate the transmission of sensitive data between entities in various contexts, including, for example, Internet banking, confidential email, cloud computing, etc. In one example, a source server can be configured to implement an encryption protocol with respect to particular target servers. Accordingly, a public key/private key arrangement in which a source server encrypts a communication using a private key and a target server decrypts the communication using a public key can be utilized to transmit and/or receive sensitive data. However, it may be time-consuming and inefficient to remove existing servers from a network and reconfigure them to support inflight encryption for transporting sensitive data between the endpoints.

DETAILED DESCRIPTION

Figure 1:
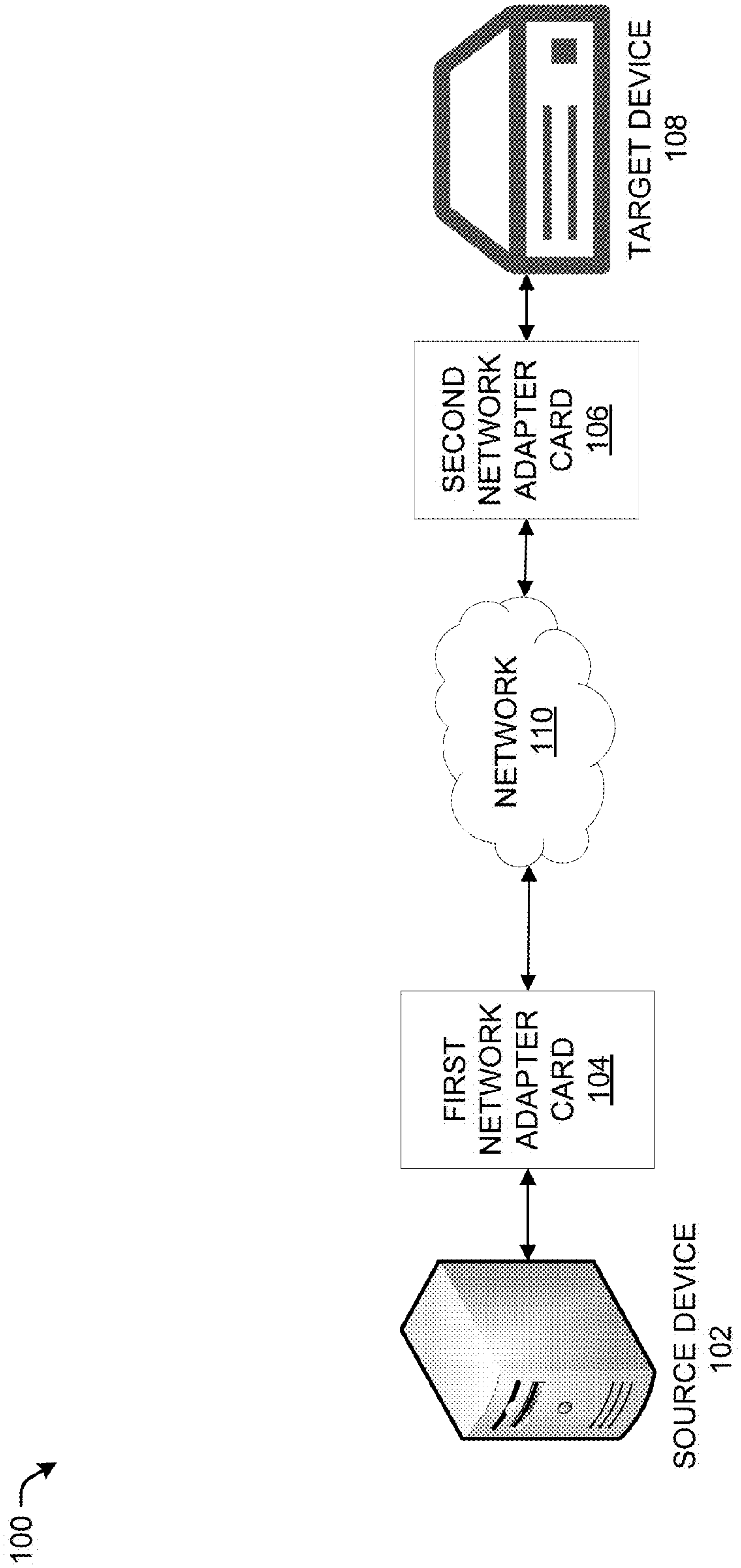
FIG. 1 shows a block diagram of an example of a computer system for inflight encryption, according to some embodiments.

Some embodiments of the present disclosure provide techniques for enabling a mechanism that provides inflight encryption for transporting sensitive data between endpoints. For example, consider a scenario involving two endpoint devices (e.g., a source device and a target device) of a network system, whereby each endpoint device can provide a secure environment via hardware devices arranged between the endpoint devices.

A source device of the endpoint devices can be on-premises at a customer location (e.g., provisioned to the customer) and contain (e.g., and/or has access to) sensitive data (e.g., customer records). The source device can be equipped to generate unencrypted data and transmit the data, via a dedicated network port over an NFS array to a target device. A first hardware device arranged along the communication path can intercept the unencrypted data, encrypt the data, and then transmit the encrypted data to the target device.

Meanwhile, in this example, the target device can be a storage device, such as a network attached storage (NAS) device that is enabled to receive the data from the source device. The encrypted data from the first hardware device can be transported across a communication network and intercepted by a second hardware device. The second hardware device can decrypt the encrypted data received from the first hardware device. The second hardware device can transmit the unencrypted data to the target device.

In this sense, the inflight encryption and decryption functionalities can be offloaded from the source and target devices to the two hardware devices. Furthermore, the software of the target and source devices does not need to be reconfigured to locally implement the encryption/decryption protocols. By offloading this functionality to the hardware devices, the data encryption and decryption are transparent to the target and source device, as each transmits and receives unencrypted data.

Additionally, the sensitive data can still be encrypted at the target device if desired. The target device can receive the unencrypted data over NFS array, encrypt the data, and then store/upload the data, for example, on behalf of the customer. In this way, techniques may enable an autonomous mechanism(s) for providing inflight encryption over an NFS network.

In an illustrative example, consider a scenario in which an enterprise provides a customer a service to transfer large amounts of data (e.g., sensitive/confidential data) to an infrastructure storage, such as NAS. To facilitate a process for securely transferring the sensitive data over the communications channel, the service provider may provide a data transfer service to the customer. The source device can transmit the sensitive data, such as personally identifiable information, over an NFS array via the data transfer service. At the source device, the sensitive data can be in an unencrypted form. A hardware device along a communication path between the source device and a target device can intercept the customer's communication and detect that the data is received via an NFS port and an "encryption phase" can begin. The first hardware device can include software and hardware for an inflight encryption, such that unencrypted data is received, encrypted by the hardware device, and outputted as encrypted data through a communication path. A second hardware device, near the end of the communication path, can decrypt the data, and transmit the unencrypted customer data to the infrastructure storage.

Certain embodiments of the present disclosure can provide techniques for enabling an autonomous mechanism that provides inflight encryption and decryption for transporting sensitive data between endpoints.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 shows a block diagram of an example of a computer system for inflight encryption, according to some embodiments. As illustrated, a source device 102, can be in communication with a first network adapter card 104, a second network adapter card 106, and a target device 108. The source device 102 can include a server device of a plurality of network server devices that can each read and write data to the target device 108 using a network file system (NFS) protocol. The NFS protocol is designed to allow the multiple network server devices to access files stored at a central server (e.g., target device 108). The NFS protocol is designed to be independent of a computer, operating system, and network architecture, and therefore the protocol can be implemented over a network regardless of the computer manufacturer. There are currently two versions of the NFS that are commonly used, the more common version 3, which is supported by Windows clients, and version 4. Based on the version, the NFS protocol can use various transport protocols, such as transmission control protocol (TCP) or user datagram protocol (UDP). TCP and UDC are standards for establishing a maintaining a network connection to transmit and receive data. The NFS protocol can permit a system administrator (e.g., a financial institution) to mount all or a portion of a file system onto a server, such as a target device 108. The mounted portion can be accessed by one or more clients (e.g., source device 102) based on a privilege level of the client (e.g., read-only, write-only).

Endpoint devices that implement the NFS protocol do not necessarily encrypt inflight communications between devices. Therefore, a communication between the source device 102 and the target device 108 is not necessarily encrypted without an additional configuration of the source device 102 and the target device 108. As described above, the source device 102 can be a server device of a plurality of network server devices. Therefore, configuring the software of the source device 102 to implement message encryption/decryption would require configuring the software of all of the network server devices and the target device 108 to implement message encryption/decryption. For practical reasons, configuring each server device of a network of server devices is labor intensive and time-consuming. Therefore, the embodiments described herein incorporate the first network adapter card 104 and the second network adapter card 106 in the communication path between the source device 102 and the target device 108 to perform the encryption and decryption. Installing the first network adapter card 104 and the second network adapter card 106 on each server of a network of server devices is less labor intensive and tedious than reconfiguring the server devices for encryption and decryption.

The first network adapter card 104 can be a hardware device, (e.g., expansion card, network interface controller) that acts as an interface between the source device 102 and the network 110. In some embodiments, the source device 102 has a blade server architecture and the first network adapter card 104 can be seated into the server chassis. In other words, the first network adapter card 104 can be physically coupled to the source device 102. The first network adapter card 104 can receive data via one or more network ports of the source device 102, in which at least one network port, such as a first network port, is dedicated to the NFS protocol. The first network port can be a software-based port where the source device 102 and the first network adapter card 104 can communicate. In real world examples, the first network port can be port 2049, which is commonly used as the default network port for the NFS protocol. The first network port can be configured to implement various transport protocols, such as TCP and UDC.

As described above, the source device 102 can include a network server device of a plurality of network server devices. In some embodiments, the source device 102 includes a dedicated first network adapter card 104, such that the first network adapter card 104 only communicates to and from the source device 102 and the target device 108.

In other embodiments, multiple network server devices can communicate to the target device 108 via the first network adapter card 104, such that the source device 102 can share the first network adapter card 104 with other network server devices. Each of the network server devices can be configured to read data from and write data to the source device 102 via the network 110. The first network adapter card 104 can be configured to receive data from one or more of these network server devices. For example, the first network adapter card 104 can include a switch to select from which network server device to receive data. Each network server device can further communicate with the target device via an NFS protocol, and each include a network port dedicated to the NFS protocol. The first network adapter card 104 can be configured to receive data from each of the network server devices via a respective network port dedicated to the NFS protocol. The first network adapter card 104 can further route data from each of the network server devices to the target device 108 via the second network adapter card 106.

The first network adapter card 104 can further be configured to encrypt data received from the source device 102 or decrypt data received from the target device via the second network adapter card 106. The first network adapter card 104 can intercept data transmitted by the source device 102. Based on intercepting the data, the first network adapter card 104 can engage in an initialization phase for encryption. During the initialization phase, the first network adapter card 104 can identify the data as being received via a first network port dedicated to the NFS protocol. Based on this determination, the first network adapter card can be configured to consider the data as unencrypted data and initialize an encryption phase to encrypt the data received from the source device 102. The first network adapter card 104 can encrypt the data received from the source device 102 through various methods. For example, the first network adapter card can be configured to store a first cryptographic key, such as a public key of the second network adapter card 106, in memory. The first network adapter card 104 can retrieve the first cryptographic key from memory and encrypt the data from the source device 102. The first network adapter card 104 can further include a second cryptographic key, such as a private key in memory. The first network adapter card 104 can further retrieve the second cryptographic key and sign the data.

The first network adapter card 104 can then transmit the signed encrypted data to the second network adapter card via the network 110. The network 110 can include various wired and wireless communication technologies such as Ethernet, fiber optics, microwave, xDSL (Digital Subscriber Line), Wireless Local Area Network (WLAN) technology, wireless cellular technology, and/or any other appropriate technology.

The second network adapter card 106 can decrypt the encrypted data received from the first network adapter card 104. Similar to the first network adapter card 104, the second network adapter card 106 can be a hardware device, (e.g., expansion card, network interface controller) that acts as an interface between the network 110 and the target device 108.

The second network adapter card 106 can use various methods to decrypt the data. Returning to the example above, the second network adapter card 106 can include a third cryptographic key, such as the first network adapter card's public key and a fourth cryptographic key, such as the second network adapter card's private key. The second network adapter card 106 can decrypt the encrypted data from the first network adapter card 104 using the second network adapter card's private key. The second network adapter card 106 can authenticate the encrypted data by reading the first network adapter card's signature using the first network adapter card's public key. The above-described encryption and decryption methods should be considered as examples, and it should be appreciated that the first network adapter card 104 and the second network adapter card 106 can encrypt or decrypt data through various methods.

The second network adapter card 106 can transmit the decrypted data to the target device 108. The target device 108 can be a file level storage device that can provide access to data to a plurality of network devices. For example, the target device can be a network attached storage (NAS) server that supports a file system that can be accessed over the network 110. The NAS server can include various storage architectures. For example, a Linux server that exports local storage via an NFS protocol can be a NAS server. The target device 108 can further include or more ports, in which at least one network port is dedicated to the NFS protocol. The target device 108 can encrypt the data independently of first network adapter card 104 and the second network adapter card 106. For example, the target device 108 can encrypt the data based on its own storage encryption protocols.

It should be appreciated that in many instances, the target device 108 can transmit a data to the source device 102 via the network 110. For example, the data transmitted by the source device can include a request from a virtual machine executing on the source device 102. In response to receiving the request, the target device 108 can retrieve stored data and transmit a response to the source device 102 via the network 110. In these instances, the inflight encryption can be performed by the second network adapter card 106 and the decryption can be performed by the first network adapter card 104. In these instances, the second network adapter card 106 can determine that the data received from the target device 108 is received via a network port dedicated to the NFS protocol. Based on the network port determination, the second network adapter card 106 can consider the data received from the target device to be unencrypted. The second network adapter card 106 can encrypt the data received from the target device 108 via various encryption methods. For example, the second network adapter card 106 can utilize a public key cryptographic method as described above. In other embodiments, the second network adapter card 106 can implement, for example, a hash function cryptographic method.

The second network adapter card 106 can transmit the encrypted data from the target device 108 to the first network adapter card 104. The first network adapter card 104 can receive the encrypted data and decrypt the data using various methods. For example, the first network adapter card 104 can utilize the public key cryptographic method as described above. In other embodiments, the first network adapter card 104 can implement, for example, a hash function cryptographic method. The first network adapter card 104 can transmit the decrypted data to the source device 102 via the network port dedicated to the NFS protocol.

As illustrated, it can be seen that the source device 102 and the target device 108 do not detect the encryption or decryption performed by the first network adapter card 104 and the second network adapter card 106 regardless of the direction of the transmission. The source device 102 can transmit unencrypted data to the target device 108 via the NFS protocol. The source device 102 further does not provide any control instructions to encrypt the data along the communication path. The data can be intercepted by the first network adapter card 104 and the second network adapter card 106 that encrypt and decrypt the data without instructions from the source device 102 or the target device 108. The target device 108 can receive unencrypted data as transmitted by the source device 102. The target device 108 can, in turn, transmit unencrypted data back to the source device without any control instruction for encryption. The data can again be intercepted by the second network adapter card 106 and the first network adapter card 104 that encrypt and decrypt the data while it is being transported from the target device 108 to the source device 102. As seen, neither the source device 102 nor the target device 108 require any additional software configuration to effectuate the encryption and decryption as both processes can be performed on the first network adapter card 104 and the second network adapter card 106.

Figure 2:
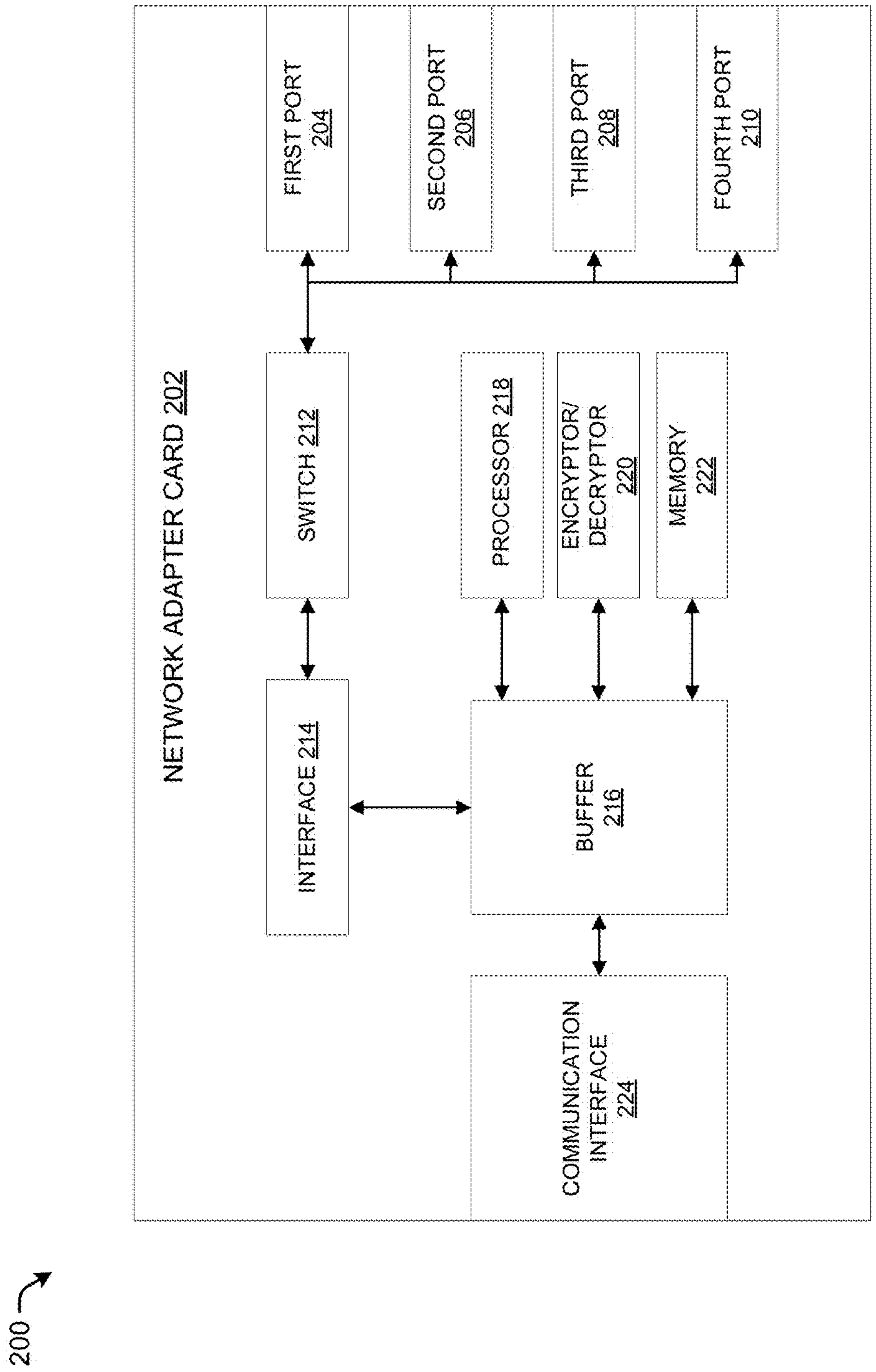
FIG. 2 shows a block diagram of a network adapter card for inflight encryption, according to some embodiments.

FIG. 2 shows a block diagram 200 of a network adapter card 202 for inflight encryption, according to some embodiments. The network adapter card 202 is operable to receive unencrypted data, for example, from a source device (e.g., source device 102) or a target device (108) and encrypt the data. The network adapter card 202 is further operable to receive encrypted data and decrypt the data.

The network adapter card 202 can include a physical port, such as first port 204 that provides a physical connection point (e.g., ethernet port, USB port, serial port) for connecting with a computing device, such as the source device 102. The first port 204 can be used to receive data, such as sensitive data via a network port dedicated to the NFS protocol. The network adapter card 202 can further include additional physical ports, such as a second port 206, a third port 208, and a fourth port 210. As described above, the network adapter card 202 can be connected to multiple network server devices and each device can be connected via a respective port.

The network adapter card 202 can include a switch 212 for switching between network server devices. The switch 212 can manage the flow of data from the network devices into the network adapter card 202 by selecting which server device to receive data from and which server device for which to transmit data.

The network adapter card 202 can further include circuitry and software, such as an application programming interface (API) for communication with a network server device.

The network adapter card 202 can include a buffer 216 that can be a region of memory to store data while the data is being moved from one point to another point. For example, the buffer 216 can be a set of registers for temporally storing values.

The network adapter card 202 can further include a processor 218, including logic circuitry for responding to and processing basic instructions. The instructions can include, for example, determining that data is received from a device via a port dedicated to a NFS protocol. The instructions can further include encrypting data, transmitting data via a network, receiving data via a network, and decrypting data.

The network adapter card 202 can further include an encryptor/decryptor 220. The encryptor/decryptor 220 can include logic circuitry for applying a cryptographic algorithm for converting an original representation into an encrypted form and converting an encrypted from back into the original representation. For example, the encryptor/decryptor 220 can apply a public key public key cryptographic method to either encrypt or decrypt data.

The network adapter card 202 can include memory 222, such as a Dynamic Random Access Memory (D-RAM), Static RAM (S-RAM), or other RAM or a flash memory.

The network adapter card 202 can include a communication interface 224 for interfacing with a network, such as network 110. The communication interface 224 may be, for example, a communications port, a wired transceiver, a wireless transceiver, and/or a network card. The communication interface 224 may be capable of communicating using technologies such as Ethernet, fiber optics, microwave, xDSL (Digital Subscriber Line), Wireless Local Area Network (WLAN) technology, wireless cellular technology, BLUETOOTH technology and/or any other appropriate technology An instance of the network adapter card 202 may be configured to perform any feature or any combination of features described above as performed by the first network adapter card 104 and the second network adapter card 106. In such an instance, the memory 222 may store instructions which, when executed by the processor 218, cause the processor 218 to perform any feature or any combination of features described above.

Although FIG. 2 shows that the network adapter card 202 includes a single processor 218, single memory device 222, and a single communication interface 224, the network adapter card 202 may include multiples of each or any combination of these components and may be configured to perform analogous functionality to that described above.

Figure 3:
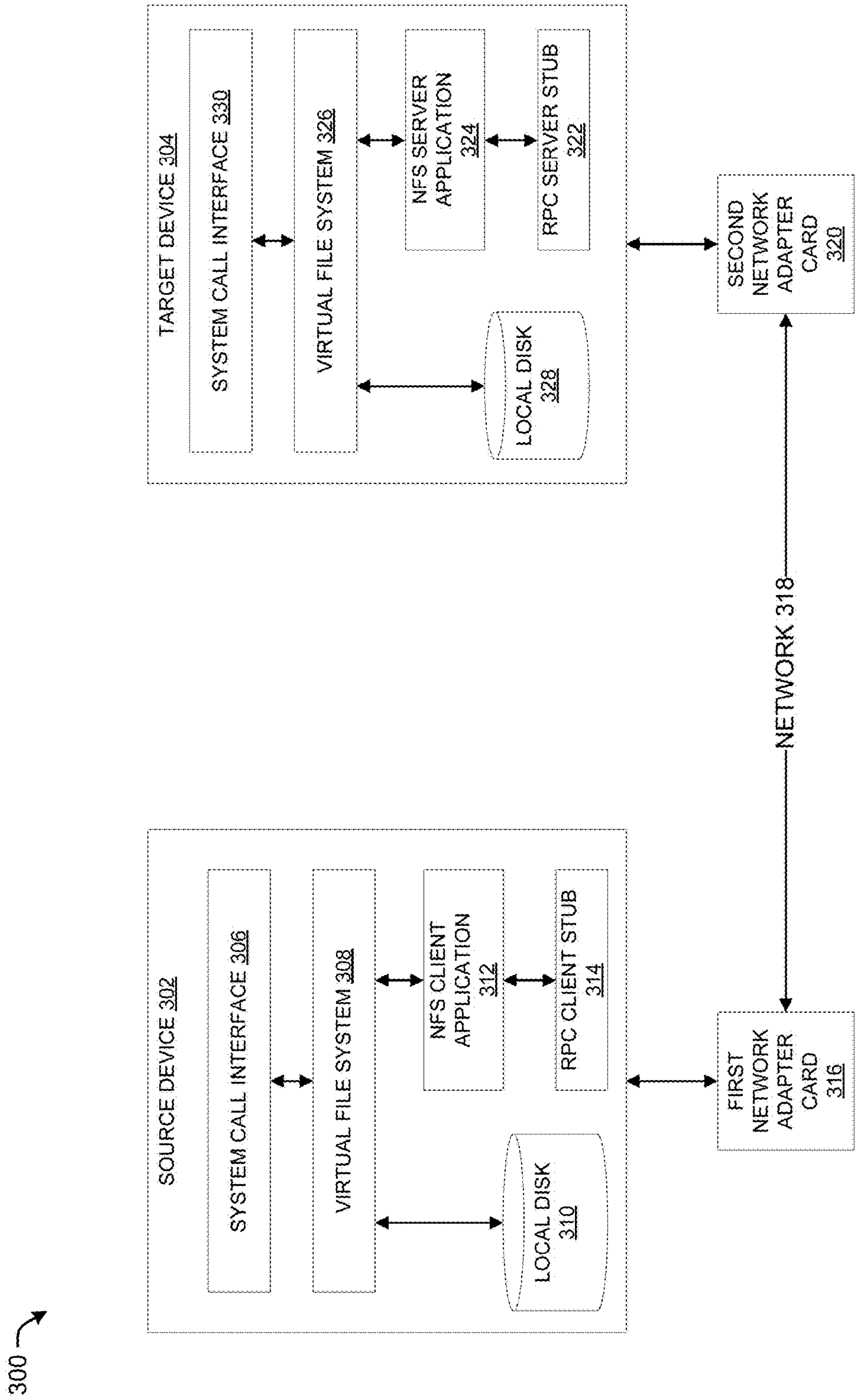
FIG. 3 shows a block diagram of an example of a computer system for inflight encryption, according to some embodiments.

FIG. 3 shows a block diagram of an example of a computer system for inflight encryption, according to some embodiments. The computer system can implement an NFS protocol for storing files on a network and allowing users to access files and directories located on remote computers. As illustrated, a source device 302 can retrieve or store information at a target device 304 via the NFS protocol. The source device 302, such as a source device 102, can include a system call interface 306 for interfacing with a user program. The system call interface 306 can provide services to a user program in response to a call, such as a remote procedure call (RPC), which is a software communication protocol for requesting a service from a program located on another computer. For example, the user program can make an RPC call to have a NAS server mount a file from the source device to a file system at the NAS server.

The source device 302 can further include a virtual file system 308 is software that forms an interface between an operating system of the source device and a physical file system. The virtual file system 308 can include a virtual file system that maps to the physical file system. In particular, the virtual file system 308 can form an interface between the operating system and a local disk 310.

The source device 302 can further include an NFS client application 312 for invoking an RPC client stub 314. The source device 302 can receive an RPC call from a user program via the system call interface 306. The call can be a request to either retrieve or store data at the target device 304 (e.g., NAS server). In response to the call, the NFS client application 312 can invoke an RPC client stub 314 to pass request parameters into a message. The RPC client stub 314 can convert the representation of the parameters into a standard format and copy each formatted parameter into the message (e.g., RPC parameters). The source device 302 can then transmit the message to the target device 304 via a port dedicated to the NFS protocol.

A first network adapter card 316 can intercept the message in route to the target device 304. The first network adapter card 316 can determine that the message was received via a network port dedicated to the NFS protocol. Based on this determination, the first network adapter card 316 can encrypt the data included in the message, including the RPC parameters. The first network adapter card 316 can further encrypt the message and transmit the message, via a network 318, to a second network adapter card 320.

The second network adapter card 320 can receive the encrypted message via the network 318. The second network adapter card 320 can further decrypt the message and transmit the decrypted message to the target device 304 via a network port dedicated to the NFS protocol.

The target device 304 (e.g., NAS server device) can include an RPC server stub 322, which can retrieve the RPC parameters from the message and call an NFS server application 324. The NFS server application 324 can process the message. For example, the message can be to retrieve data from or store data to the target device 304. The NFS server application 324 can access the virtual file system 326 of the target device 304. The NFS server application 324 can further locate a file system of the target device at a local disk 328 via the virtual file system 326 to service the request from the source device. The target device 304 can further include a system call interface 330 for processing calls for server-side applications. To respond to the source device 302, the above process, can be performed in reverse, where the RPC server stub 322 creates a message with RPC parameters, the second network adapter card 320 encrypts the message, the first network adapter card 316 decrypts the message, and the source device 302 receives the message.

As seen, the source device 302 and the target device 304 can communicate over the network 318 via a secure and encrypted communication. Furthermore, neither the source device 302 nor the target device 304 are configured for the encryption and decryption processes. Therefore, pre-existing network server devices do not need to be configured to perform the encryption and decryption. These responsibilities can be offloaded to the first network adapter card 316 and the second network adapter card 320.

Figure 4:
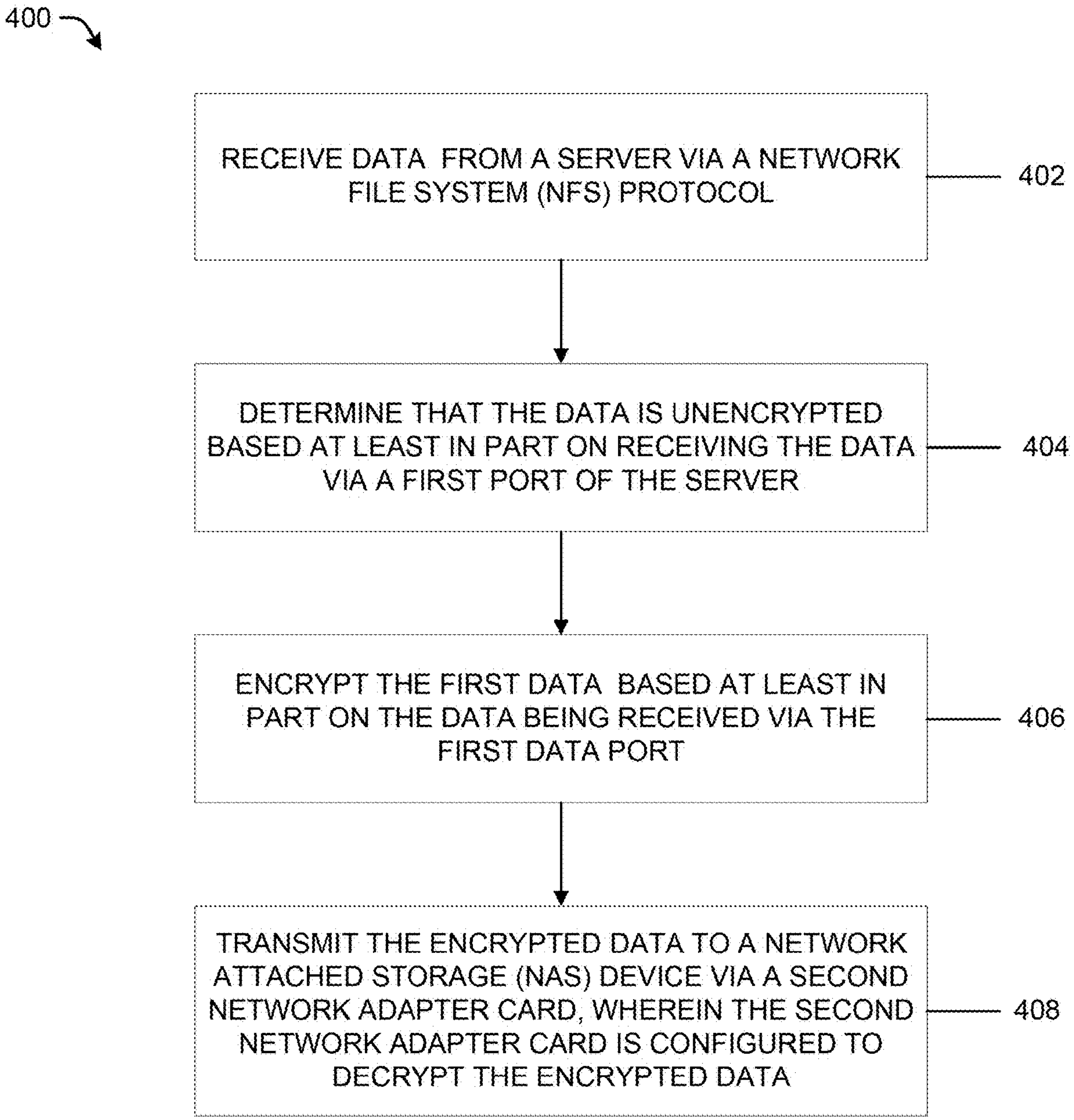
FIG. 4 shows a process flow for inflight encryption, according to some embodiments.

FIG. 4 shows a process flow 400 for inflight encryption, according to some embodiments. At 402, a first network adapter card can receive data from a server (e.g., source device 102) via a network file system (NFS) protocol. For example, the data can be received by the computing device via a first port, such as a network port dedicated for the NFS protocol. The first network adapter card can be a hardware device physically coupled to the server device. The server can intend to transmit the data to a target device, such as a NAS server device. The server further does not include control instructions to encrypt the data, and the data can still be encrypted by the first network adapter card.

At 404, the first network adapter card can determine that the data is unencrypted. For example, the first network adapter card can detect that the data was received via the dedicated network port. Based on this port determination, the first network adapter card can determine that the data is unencrypted. The first network chapter card can further initialize an encryption phase to begin encrypting the data. The encryption phase can include, for example, retrieving cryptographic keys for encryption.

At 406, the first network adapter card can encrypt the data received from the server. The first network adapter card can encrypt the data based on the data being received via the first port. In some embodiments, the first network adapter card can be configured to encrypt all data received via the first port. The first network adapter card can encrypt the data based on various encryption methods, such as by using a public key cryptographic method or a hashing method.

At 408, the first network adapter card can transmit the encrypted data to a target device via a second network adapter card. The second network adapter card can be arranged along a communication path between the first network adapter card and the target device. The second network adapter card can further be configured to decrypt the encrypted data prior to the data reaching the target device. Similar to the first network adapter card, the second network adapter card can be a hardware device physically coupled to the target device.

Figure 5:
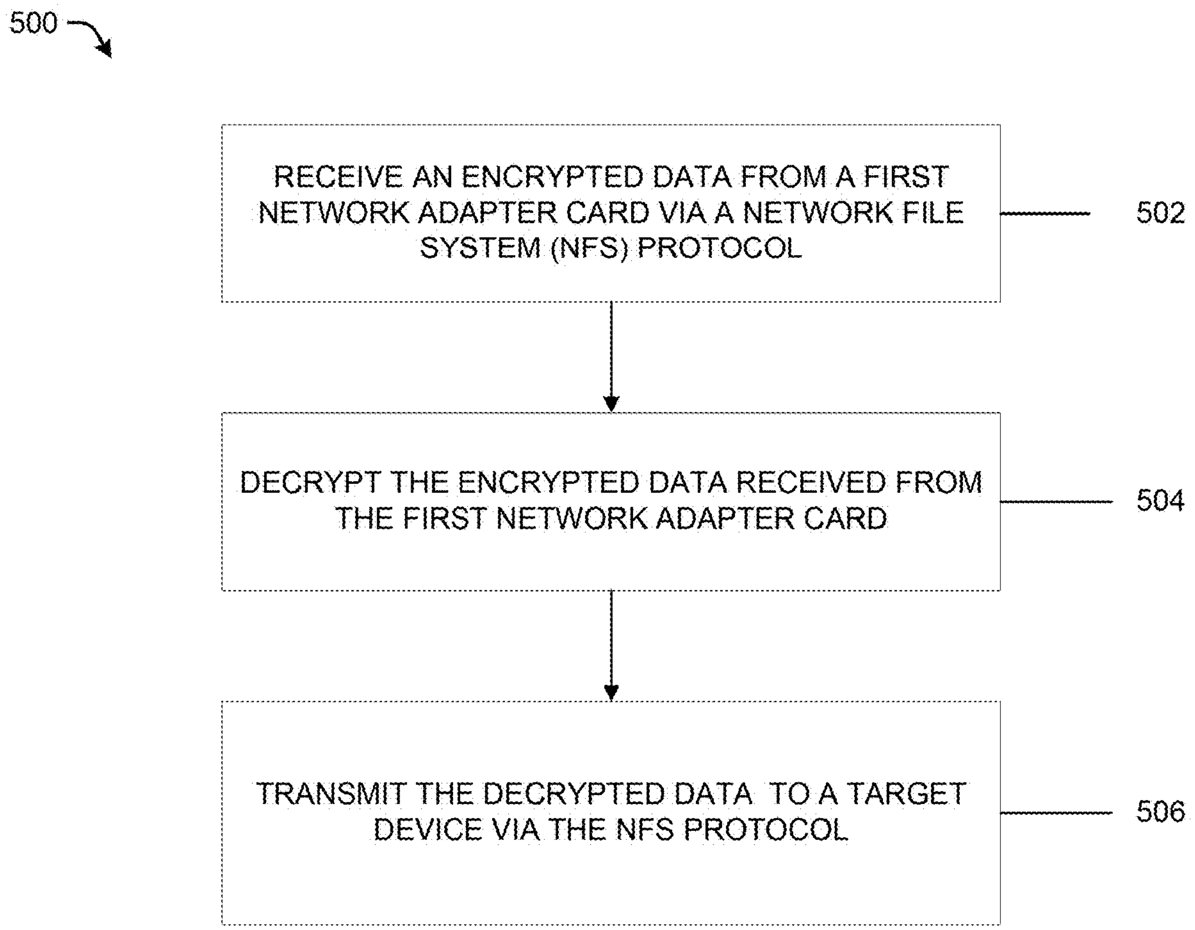
FIG. 5 shows a process flow for inflight decryption, according to some embodiments.

FIG. 5 shows a process flow 500 for inflight decryption, according to some embodiments. At 502, a second network adapter card can receive encrypted data from a first network adapter card via a network. The second network adapter card can be a hardware device physically coupled to a target device, such as a NAS server device. The encrypted data can have originated from a source device and encrypted by the first network adapter card.

At 504, the second network adapter card can decrypt the encrypted data received from the first network adapter card. The second network adapter card can be pre-configured to enable the decryption of the encrypted data. For example, a network administrator can configure both the first network adapter card and the second adapter card to include symmetric keys, asymmetric keys, or hashing functions, such that the second network adapter card can decrypt the encrypted data.

At 506, the second network adapter card can transmit the decrypted data to the target device (e.g., NAS server device) via an NFS protocol. For example, the second network adapter card can transmit the unencrypted data to the target device via a network port dedicated for the NFS protocol. It should be appreciated that as the decryption circuitry is located on the second network adapter card, the target device can be unable to detect the encryption and decryption performed by the network adaptor devices. In some embodiments, the target device can perform its own encryption of the data to conform to any of the device's own security protocols.

Figure 6:
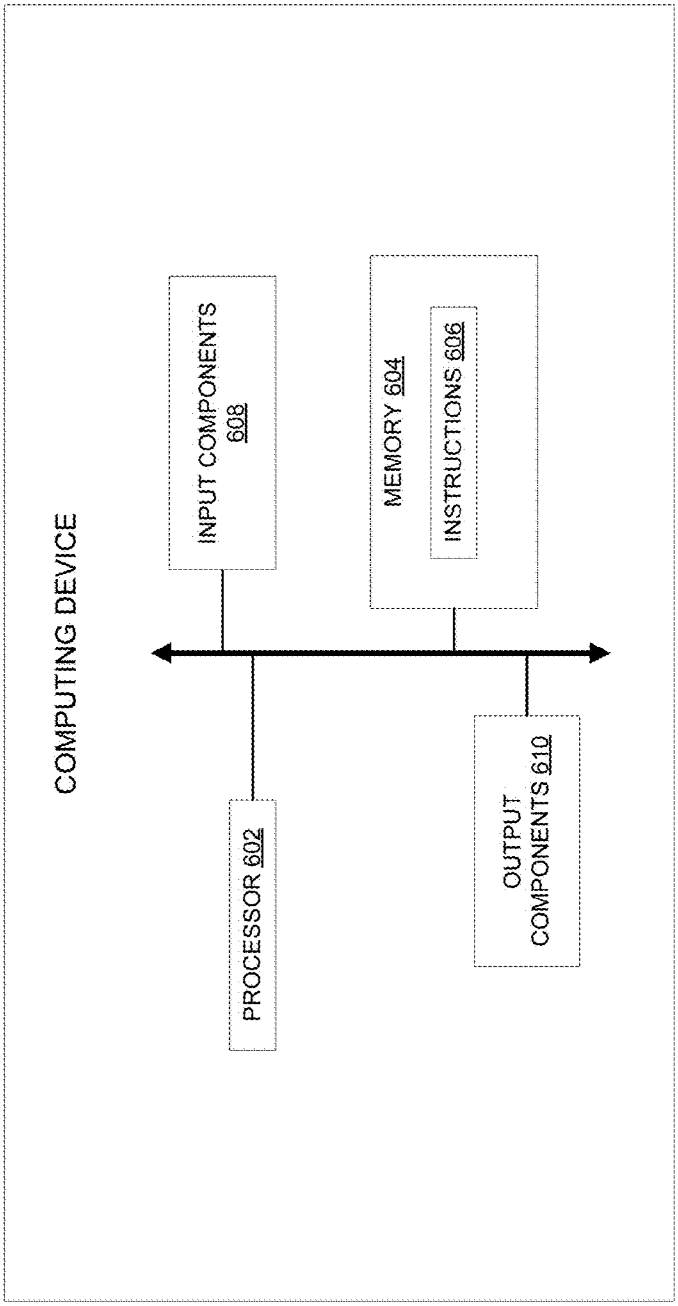
FIG. 6 shows a block diagram of an example of a computing device usable for implementing some aspects of the present disclosure.

FIG. 6 shows a block diagram of an example of a computing device 600 usable for implementing some aspects of the present disclosure. For example, the computing device 600 can correspond to the first encryption/decryption card of FIG. 1 or the user device described above.

The computing device 600 includes a processor 602 coupled to a memory 604 via a bus 612. The processor 602 can include one processing device or multiple processing devices. Examples of the processor 602 include a Field-Programmable Gate Array (FPGA), an application-specific integrated circuit (ASIC), a microprocessor, or any combination of these. The processor 602 can execute instructions 606 stored in the memory 604 to perform operations. Examples of such operations can include any of the functionality described above with respect to the first network adapter card 104. In some examples, the instructions 606 can include processor-specific instructions generated by a compiler or an interpreter from code written in any suitable computer-programming language, such as C, C++, C #, Python, or Java.

The memory 604 can include one memory device or multiple memory devices. The memory 604 may be non-volatile and include any type of memory device that retains stored information when powered off. Examples of the memory 604 can include electrically erasable and programmable read-only memory (EEPROM), flash memory, or any other type of non-volatile memory. At least some of the memory 604 includes a non-transitory computer-readable medium from which the processor 602 can read instructions 606. A computer-readable medium can include electronic, optical, magnetic, or other storage devices capable of providing the processor 602 with computer-readable instructions or other program code. Examples of a computer-readable medium include magnetic disks, memory chips, ROM, random-access memory (RAM), an ASIC, a configured processor, optical storage, or any other medium from which a computer processor can read the instructions 606.

The computing device 600 may also include other input and output (I/O) components. The input components 608 can include a mouse, a keyboard, a trackball, a touch pad, a touch-screen display, or any combination of these. The output components 610 can include a visual display, an audio display, a haptic display, or any combination of these. Examples of a visual display can include a liquid crystal display (LCD), a light-emitting diode (LED) display, and a touch-screen display. An example of an audio display can include speakers. Examples of a haptic display may include a piezoelectric device or an eccentric rotating mass (ERM) device.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

The invention claimed is:

1. A system, comprising:
- one or more processors arranged on a first network adapter card; and
- one or more computer-readable media having stored thereon a sequence of instructions which, when executed, cause the one or more processors to:
  - transmit, to a network attached storage (NAS) device, a request from a server for first data;
  - receive the first data from the NAS device via a network file system (NFS) protocol based at least in part on the request, wherein the first network adapter card is configured for inflight encryption of the first data;
  - determine that the first data from the NAS device was received via an NFS port of a plurality of ports;
  - determine that the first data is unencrypted based at least in part on receiving the first data via the NFS port of the plurality of ports;
  - encrypt the first data based at least in part on the first data being received via the NFS port; and
  - transmit the encrypted first data to the server via the first network adapter card and a second network adapter card, wherein the second network adapter card is configured for inflight decryption of the encrypted first data received from the first network adapter card.

2. The system of claim 1, wherein the sequence of instructions, when executed, further cause the one or more processors to:

receive the request from the server for the first data via the second network adapter card, wherein the request is encrypted; and decrypt the request based at least in part on receiving the request via the second network adapter card, wherein the request transmitted to the NAS device is the decrypted request.

3. The system of claim 1, wherein the sequence of instructions, when executed, further cause the one or more processors to:

access a first cryptographic key and a second cryptographic key based at least in part on determining that the first data from the NAS device was received via the NFS port;

encrypt the first data using the first cryptographic key, wherein the first cryptographic key is associated with the second network adapter card; and sign the encrypted first data using the second cryptographic key.

4. The system of claim 1, wherein the first network adapter card is arranged on a communication path between the NAS device and the second network adapter card.

5. The system of claim 1, wherein the first data comprises remote procedure call (RPC) parameters, and wherein the sequence of instructions, when executed, further cause the one or more processors to:

encrypt the RPC parameters based at least in part on determining that the first data from the NAS device was received via the NFS port.

6. The system of claim 1, wherein the first network adapter card is physically coupled to the NAS device.

7. The system of claim 1, wherein circuitry for encrypting the first data is arranged on the first network adapter card.

8. A method comprising:

transmitting, by a first network adapter card, to a network attached storage (NAS) device, a request from a server for first data;

receiving, by the first network adapter card, the first data from the NAS device via a network file system (NFS) protocol based at least in part on the request, wherein the first network adapter card is configured for inflight encryption of the first data;

determining, by the first network adapter card, that the first data from the NAS device was received via an NFS port of a plurality of ports;

determining, by the first network adapter card, that the first data is unencrypted based at least in part on receiving the first data via the NFS port of the plurality of ports;

encrypting, by the first network adapter card, the first data based at least in part on the first data being received via the NFS port; and transmitting, by the first network adapter card, the encrypted first data to the server via the first network adapter card and a second network adapter card, wherein the second network adapter card is configured for inflight decryption of the encrypted first data received from the first network adapter card.

9. The method of claim 8, wherein the method further comprises:

receiving the request from the server for the first data via the second network adapter card, wherein the request is encrypted; and decrypting the request based at least in part on receiving the request via the second network adapter card, wherein the request transmitted to the NAS device is the decrypted request.

10. The method of claim 8, wherein the method further comprises:

accessing a first cryptographic key and a second cryptographic key based at least in part on determining that the first data from the NAS device was received via the NFS port;

encrypting the first data using the first cryptographic key based at least in part on receiving the request from the second network adapter card, wherein the first cryptographic key is associated with the second network adapter card; and signing the encrypted first data using the second cryptographic key.

11. The method of claim 8, wherein the first network adapter card is arranged on a communication path between the NAS device and the second network adapter card.

12. The method of claim 8, wherein the first data comprises remote procedure call (RPC) parameters, and wherein the method further comprises:

encrypting the RPC parameters based at least in part on determining that the first data from the NAS device was received via the NFS port.

13. The method of claim 8, wherein the first network adapter card is physically coupled to the NAS device.

14. The method of claim 8, wherein circuitry for encrypting the first data is arranged on the first network adapter card.

15. One or more non-transitory computer-readable media having stored thereon a sequence of instructions which, when executed by one or more processors, cause a first network adapter card to:

transmit, to a network attached storage (NAS) device, a request from a server for first data;

receive the first data from the NAS device via a network file system (NFS) protocol based at least in part on the request, wherein the first network adapter card is configured for inflight encryption of the first data;

determine that the first data from the NAS device was received via an NFS port of a plurality of ports;

determine that the first data is unencrypted based at least in part on receiving the first data via the NFS port of the plurality of ports;

encrypt the first data based at least in part on the first data being received via the NFS port; and transmit the encrypted first data to the server via the first network adapter card and a second network adapter card, wherein the second network adapter card is configured for inflight decryption of the encrypted first data received from the first network adapter card.

16. The one or more non-transitory computer-readable media of claim 15, wherein the sequence of instructions, when executed by the one or more processors, cause processing circuitry to:

receive the request from the server for the first data via the second network adapter card, wherein the request is encrypted; and decrypt the request based at least in part on receiving the request via the second network adapter card, wherein the request transmitted to the NAS device is the decrypted request.

17. The one or more non-transitory computer-readable media of claim 15, wherein the sequence of instructions, when executed by the one or more processors, cause processing circuitry to:

access a first cryptographic key and a second cryptographic key based at least in part on determining that the first data from the NAS device was received via the NFS port;

encrypt the first data using the first cryptographic key based at least in part on receiving the request from the second network adapter card, wherein the first cryptographic key is associated with the second network adapter card; and sign the encrypted first data using the second cryptographic key.

18. The one or more non-transitory computer-readable media of claim 15, wherein the first network adapter card is arranged on a communication path between the NAS device and the second network adapter card.

19. The one or more non-transitory computer-readable media of claim 15, wherein the first data comprises remote procedure call (RPC) parameters, and wherein the sequence of instructions, when executed by the one or more processors, cause processing circuitry to:

encrypt the RPC parameters based at least in part on determining that the first data from the NAS device was received via the NFS port.

20. The one or more non-transitory computer-readable media of claim 15, wherein the first network adapter card is physically coupled to the NAS device.

* * * * *